United States Patent
Chin et al.

(10) Patent No.: US 6,896,376 B2
(45) Date of Patent: May 24, 2005

(54) COLOR WHEEL AND MOTOR FOR THE SAME

(75) Inventors: Ke-Shu Chin, Junghe (TW); Chih-Neng Chang, Taipei (TW); Kuang-Hua Chang, Junghe (TW)

(73) Assignee: Prodisc Technology Inc., Taipei (TW)

( * ) Notice: Subject to any disclaimer, the term of this patent is extended or adjusted under 35 U.S.C. 154(b) by 14 days.

(21) Appl. No.: 10/271,786

(22) Filed: Oct. 17, 2002

(65) Prior Publication Data

US 2004/0075819 A1 Apr. 22, 2004

(51) Int. Cl.⁷ .................. G03B 21/14; G03B 21/00; H04N 9/12; G02B 5/22
(52) U.S. Cl. .................. 353/84; 353/31; 348/743; 359/889; 359/892
(58) Field of Search ............. 353/31, 84; 348/742, 348/743; 359/889, 891, 892, 580, 578, 890; 362/293

(56) References Cited

U.S. PATENT DOCUMENTS

| | | | | |
|---|---|---|---|---|
| 5,868,482 A | * | 2/1999 | Edlinger et al. | 353/84 |
| 6,011,662 A | * | 1/2000 | Evans | 359/891 |
| 6,024,453 A | * | 2/2000 | Edlinger et al. | 353/84 |
| 6,520,644 B1 | * | 2/2003 | Lee | 353/31 |
| 6,604,830 B1 | * | 8/2003 | Chiu et al. | 353/84 |
| 6,705,733 B1 | * | 3/2004 | Yu et al. | 353/84 |
| 6,715,887 B2 | * | 4/2004 | Chang | 353/84 |
| 6,747,803 B2 | * | 6/2004 | Hung | 359/634 |
| 6,755,554 B2 | * | 6/2004 | Ohmae et al. | 362/293 |
| 2003/0035218 A1 | * | 2/2003 | Hung | 359/618 |

* cited by examiner

Primary Examiner—Judy Nguyen
Assistant Examiner—Melissa J Koval

(74) Attorney, Agent, or Firm—Birch, Stewart, Kolasch & Birch, LLP

(57) ABSTRACT

A color wheel including a motor body, a housing and a color filter. The housing is set to a side of the central axis of the motor body. The color filter is set on the housing. In this case, a circumferential housing surface is formed with a recess. In addition, the invention also provides a motor for a color wheel. The motor includes a motor body and a housing, both of which have the same features as those described above.

17 Claims, 5 Drawing Sheets

US 6,896,376 B2

COLOR WHEEL AND MOTOR FOR THE SAME

BACKGROUND OF THE INVENTION

1. Field of the Invention

The invention relates to a color wheel and a motor for the same, and in particular to a color wheel and a motor for the color wheel, both of which are used in the projection technology.

2. Description of the Related Art

Digital Light Processing (DLP) is a widely used projection technology. DLP has several advantages over other methods including, high brightness, accurate tone reproduction, quick response time, noise-free operation, thin and light composition and the like.

In a DLP projector, a digital control method and a reflection principle are adopted. Light rays from the light source are collected and focused by the lens to pass through three color filters. Then, the light rays are projected onto a Digital Micro-mirror Device (DMD). Since the DMD includes several movable micro mirrors, the tilt angle and deflection time of each movable mirror may be controlled by driving electrodes. Then, the light rays are projected to form an image by switching the direction of the light ray reflections.

In the DLP projector, a color wheel 3 for generating the light rays of several colors is generally provided. Referring to FIG. 1, the color wheel 3 mainly includes a washer 31, a color filter 32 and a motor 33. The washer 31 and the color filter 32 are mounted on the motor 33. In this case, the motor 33 includes a housing 331 and a motor body 332 which rotates together with the housing 331.

Besides, the color wheel is also used in Liquid Crystal on Silicon (LCOS) projectors and Liquid Crystal Display (LCD) projectors. Herein, the function of the color wheel is the same as in DLP projectors for separating the light rays into several colors.

In general, the motor for the color wheel rotates at a speed higher than 7200 rpm. When the rotation center of the motor is away from the central axis of the rotation shaft (i.e., when the rotation center is not located on the central axis of the rotation shaft), the operation of the color wheel may be adversely influenced by vibration and noise.

It is therefore an important subject of the invention to provide a color wheel and a motor for the same to solve the problem mentioned above.

SUMMARY OF THE INVENTION

An object of the invention is to provide a color wheel and a motor for the same, each of which may have the advantages of correcting the rotation center, reducing vibration and noise, and increasing operational reliability.

To achieve the above-mentioned object, the invention provides a color wheel including a motor body, a housing and a color filter. The housing is set to a side of the central axis of the motor body. The color filter is set on the housing. A circumferential housing surface is formed with a recess. In addition, the invention also provides a motor for a color wheel. The motor includes a motor body and a housing. The housing is set to a side of the central axis of the motor body. A circumferential housing surface is formed with a recess.

As mentioned above, the invention provides a color wheel and a motor for the same, in which an added counterpoise is positioned within a specific recess on the motor so that the position of the rotation center may be corrected. Compared to the prior art, the difficulty of positioning in this invention may be decreased by fitting or adhering the counterpoise into the specific recess of the motor. Furthermore, since the counterpoise may be placed totally within the recess, it is free from collisions. Also, the influence on the counterpoise caused by centrifugal force is reduced. Moreover, since the rotation center of the color wheel may be corrected, the vibration and noise caused by the color wheel is further reduced, and the operational reliability is also improved.

DETAILED DESCRIPTION OF THE INVENTION

The color wheel and motor for the same in accordance with preferred embodiments of the invention will be described with reference to the accompanying drawings.

Figure 1:
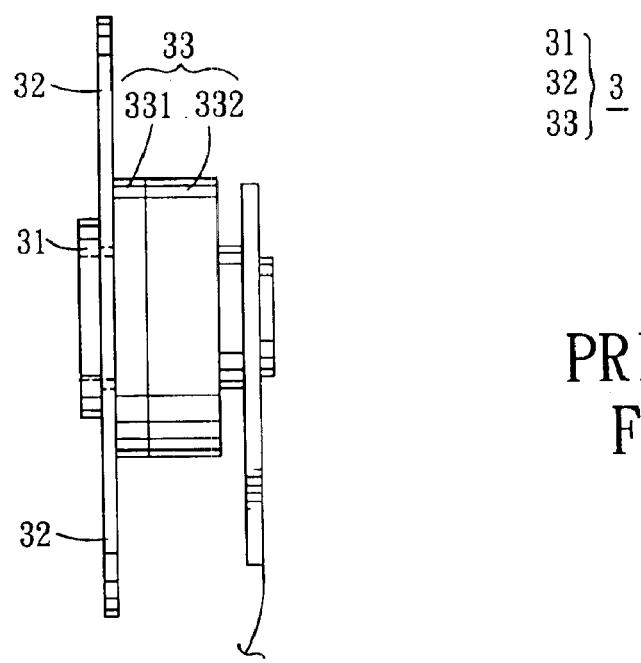
FIG. 1 is a schematic illustration that shows a side view of a conventional color wheel.
Figure 2A:
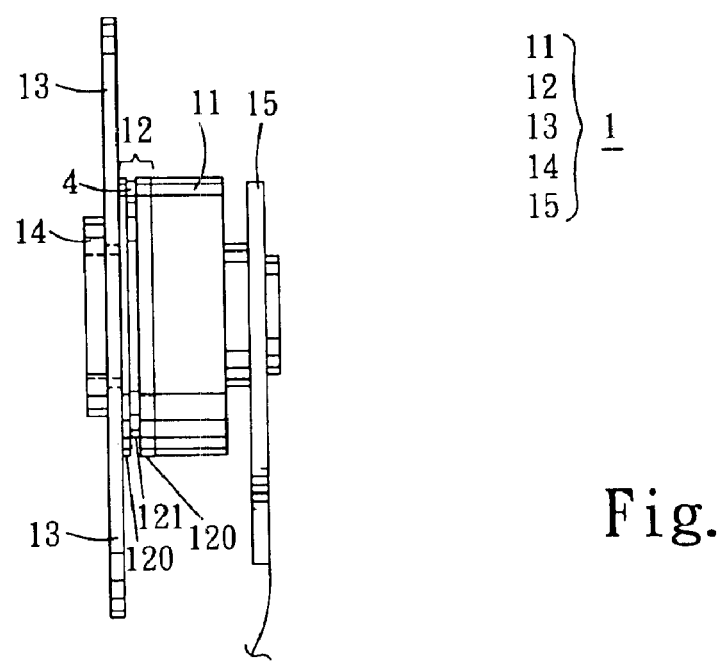
FIGS. 2a to 2c are schematic illustrations that show side views of the color wheel in accordance with an embodiment of the invention.

Referring to FIG. 2a, a color wheel 1 provided by an embodiment of the invention includes a motor body 11, a housing 12 and a color filter 13. The housing 12 is set to a side of the central axis of the motor body 11 and rotates together with the motor body 11. The color filter 13 is set on the housing 12 and also rotates together with the motor body 11. The housing 12 has a circumferential surface 120 formed with a recess 121, which may be a groove, chamfer, opening, or similar.

In this embodiment, the motor body 11 mainly includes a magnetic ring (not shown), laminated steel stack (not shown) and a coil (not shown). When the coil is powered on, the laminated steel stack produce magnetic force and a magnetic field. The positive or negative properties as well as the intensity of the current may cause the magnetic field to vary in an ordered manner. That is, a rotary magnetic field will cooperate with the magnetic ring, which will rotate accordingly.

As shown in FIG. 2a, the housing 12 is set to a side of the central axis of the motor body 11 and rotates together with the motor body 11. The circumferential surface 120 of the housing 12 is formed with a recess 121 such as a groove.

Figure 2B:
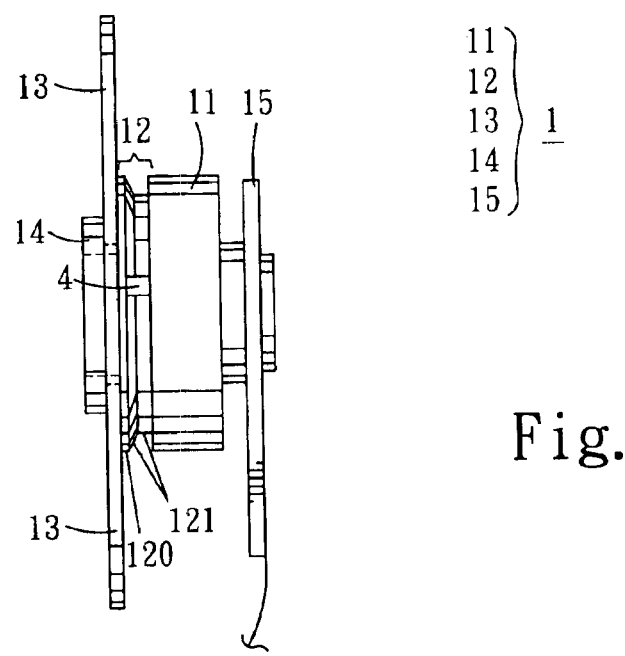
Figure 2C:
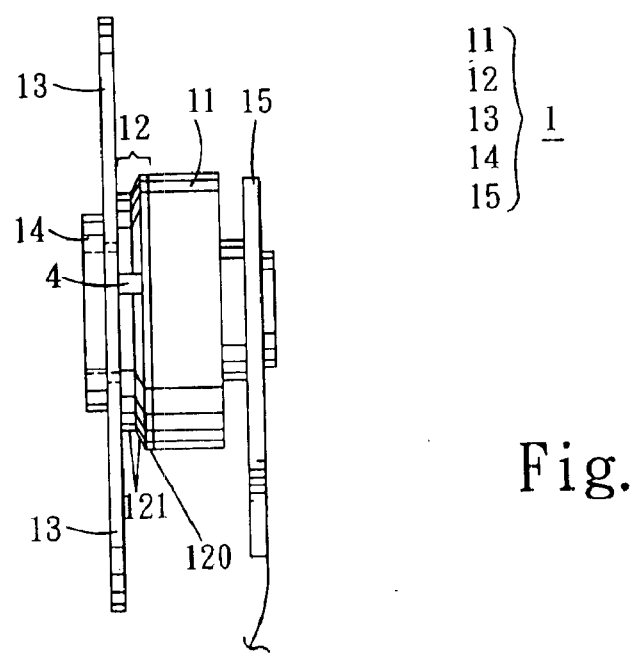

Alternatively, as shown in FIG. 2b, the housing 12 may be formed with a recess such as a chamfer adjacent to the motor body 11 so that a groove is formed between the housing 12 and the motor body 11. Similarly, as shown in FIG. 2c, the housing 12 may be formed with a recess such as a chamfer adjacent to the color filter 13 so that a groove is formed between the housing 12 and the color filter 13. In this case, the chamfer of the housing 12 may be a ring-shaped chamfer or a substantially ring-shaped chamfer.

Figure 3:
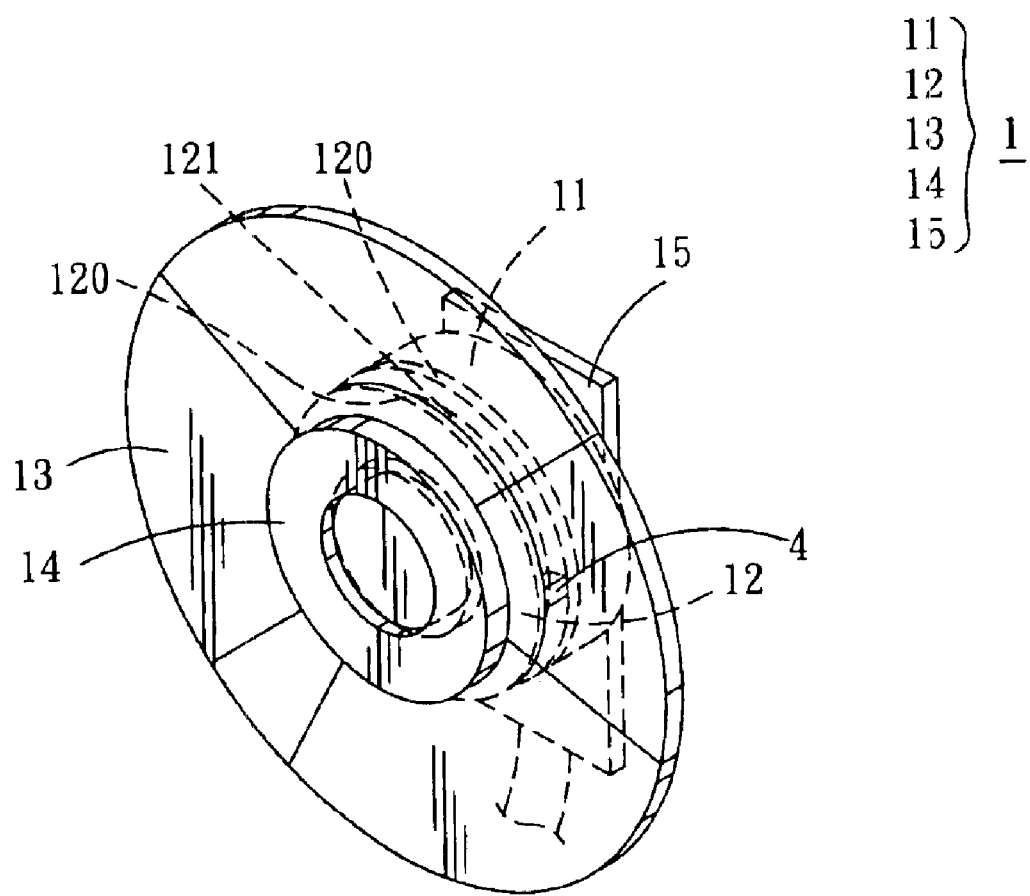
FIG. 3 is a pictorial view of FIG. 2b.
Figure 4:
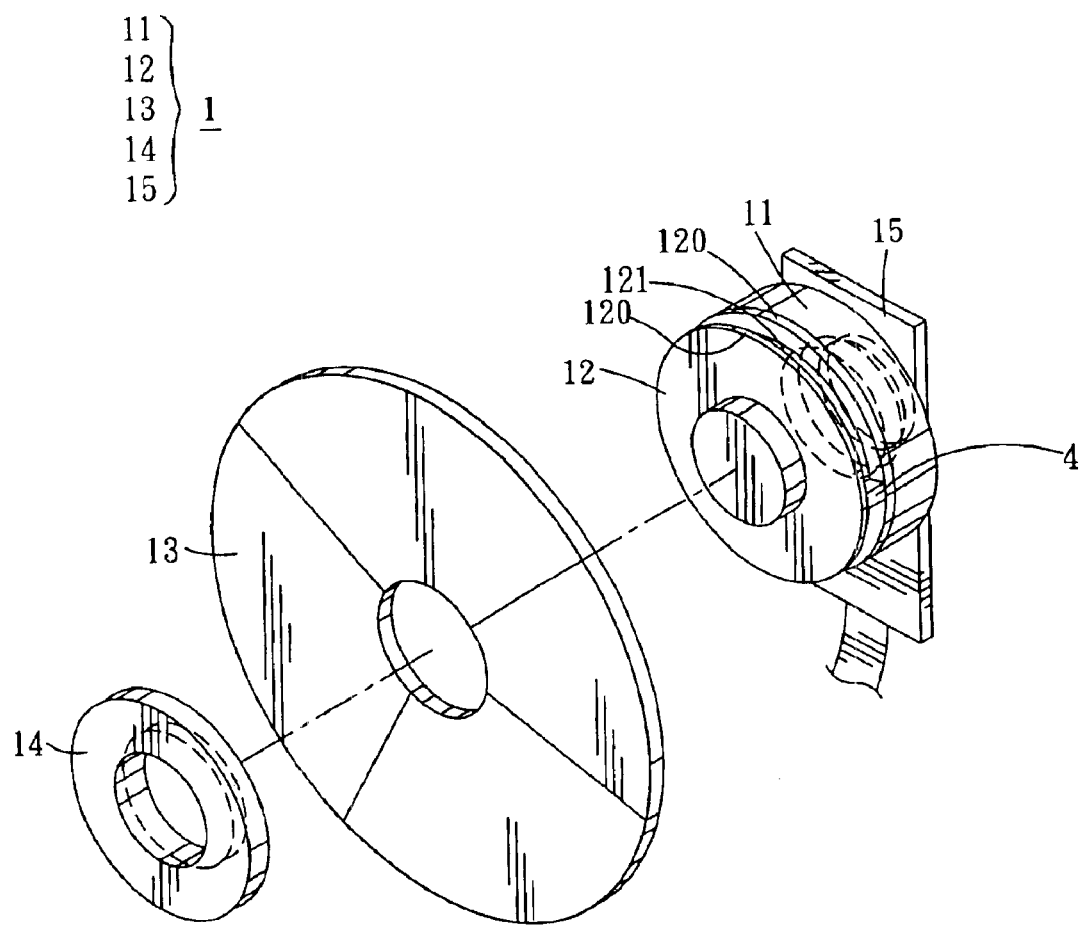
FIG. 4 is a partially pictorial and exploded view of FIG. 3.

FIG. 3 is a pictorial view of FIG. 2b, and FIG. 4 is a partially pictorial and exploded view of FIG. 3.

As shown in FIGS. 3 and 4, the color filter 13 is set on the housing 12 by way of, for example, a fitting or adhering process. In this case, the color filter 13 is a circular filter composed of three filter sectors of red, green and blue. The color filter 13 may also be a circular filter or a ring-shaped filter composed of one transparent block and three or more filter sectors of red, green and blue.

Referring again to FIG. 3, the color wheel 1 of this embodiment further includes a washer 14, which is set on the color filter 13 by way of, for example, a fitting or adhering process. In this case, the washer 14 is used to enlarge the contact area between the color filter 13 and the housing 12.

Referring again to FIG. 3, the color wheel 1 of this embodiment further includes a positioning plate 15 on which the motor body 11 is pivotally mounted. The positioning plate 15 is connected to an actuator (not shown) via wires (not shown). The actuator drives the motor body 11 to rotate about a central axis corresponding to the pivotal point between the positioning plate 15 and the motor body 11.

After the color wheel 1 rotates for a period of time, the rotation center of the color wheel may be offset from the central axis (not shown) due to prolonged usage. Therefore, when the rotation center is not positioned on the central axis, vibration and noise may result and the operational reliability may be adversely affected.

In this embodiment, a counterpoise, which may be any block 4 (as shown in FIGS. 2a, 2b, 2c, 3 and 4) or counterbalance having a predetermined weight, is used to correct the rotation center. The correction method is performed by fitting or engaging the counterpoise to the recess 121 of the housing 12, and using a machine to adjust the position of the counterpoise in the recess according to the degree of displacement of the rotation center, Of course, the counterpoise may also be adhered to the recess 121.

In addition, another embodiment of the invention provides a motor 2 for a color wheel. The motor 2 includes a motor body 21 and a housing 22 rotates together with the motor body 21. The housing 22 is set to a side of the central axis of the motor body 21. The housing 22 has a circumferential surface 220 formed with a recess 221 such as a groove, chamfer, opening, or similar as shown in FIG. 5.

Since the elements in this embodiment have the same features and functions as those of the corresponding elements in the color wheel 1, detailed description thereof will be omitted.

Figure 5:
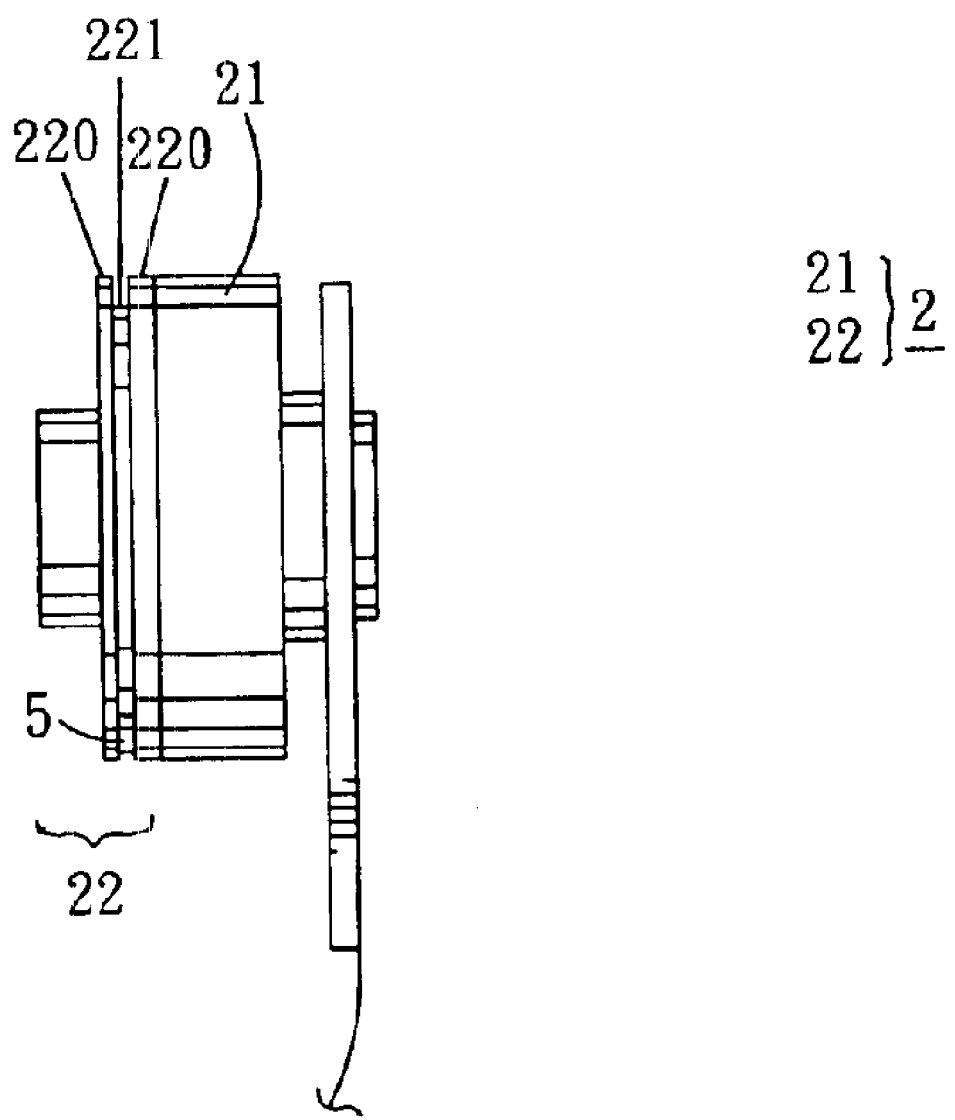
FIG. 5 is a schematic illustration that shows a side view of a motor for a color wheel in accordance with another embodiment of the invention.

In this embodiment, a counterpoise, which may be any block 5 (as shown in FIG. 5) or counterbalance having a predetermined weight, is used to correct the rotation center. The correction method is performed by fitting or engaging the counterpoise to the recess 221 of the housing 22, and using a machine to adjust the position of the counterpoise in the recess according to the degree of displacement of the rotation center. Of course, the counterpoise may also be adhered to the recess 221.

In the color wheel and motor for the same of this invention, the rotation center may be corrected by adding a counterpoise to a specific recess in the motor. Compared to the prior art, the difficulty of positioning in this invention may be decreased by fitting or adhering the counterpoise into the specific recess of the motor. Furthermore, since the counterpoise may be placed totally within the recess, it is free from collisions. Also, the influence on the counterpoise caused by centrifugal force is reduced. Moreover, since the rotation center of the color wheel may be corrected, the vibration and noise caused by the color wheel are further reduced, and the operational reliability is also improved.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A color wheel comprising:

a motor including:

a rotating motor body and a rotating housing set to a side of the central axis of the motor body; and a color filter set on a side of the housing, opposite to said motor body, wherein the housing has a circumferential surface formed with a recess, and a block is set in the recess.

2. The color wheel according to claim 1, wherein the recess of the housing is a groove.

3. The color wheel according to claim 1, wherein the recess of the housing is a chamfer adjacent to the motor body so that a groove is formed between the housing and the motor body.

4. The color wheel according to claim 1, wherein the recess of the housing is a chamfer adjacent to the color filter so that a groove is formed between the housing and the color filter.

5. The color wheel according to claim 1, wherein the recess of the housing is a ring-shaped recess.

6. The color wheel according to claim 1, wherein the recess of the housing comprises a plurality of openings.

7. The color wheel according to claim 1, further comprising a washer set on the color filter.

8. The color wheel according to claim 1, further comprising a positioning plate on which the motor body is pivotally mounted.

9. A motor for a color wheel, comprising:

a rotating motor body; and a rotating housing set at a side of a central axis of the motor body, wherein the housing has a circumferential surface formed with a recess, and a block is set in the recess.

10. The motor according to claim 9, wherein the recess of the housing is a groove.

11. The motor according to claim 9, wherein the recess of the housing is a chamfer adjacent to the motor body so that a groove is formed between the housing and the motor body.

12. The motor according to claim 9, wherein the recess of the housing is a chamfer away from the motor.

13. The motor according to claim 9, wherein the recess of the housing is a ring-shaped recess.

14. The motor according to claim 9, further comprising a positioning plate on which the motor body is pivotally mounted.

15. The motor according to claim 9, wherein the recess of the housing comprises a plurality of openings.

16. The color wheel according to claim 1, wherein the circumferential surface and the central axis are parallel.

17. The color wheel according to claim 9, wherein the circumferential surface and the central axis are parallel.

* * * * *